United States Patent
Jayasuriya et al.

(10) Patent No.: US 7,673,902 B2
(45) Date of Patent: Mar. 9, 2010

(54) DEPLOYABLE RUNNING BOARD TO PROVIDE ROLLOVER RESISTANCE

(75) Inventors: A. Mangala M. Jayasuriya, Bloomfield Hills, MI (US); Roger Chen, Troy, MI (US); Priya Prasad, Plymouth, MI (US); Nripen Saha, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 667 days.

(21) Appl. No.: 11/606,266

(22) Filed: Nov. 29, 2006

(65) Prior Publication Data

US 2008/0122258 A1 May 29, 2008

(51) Int. Cl.
*B60R 21/00* (2006.01)
(52) U.S. Cl. .................................... 280/755
(58) Field of Classification Search ................ 280/755, 280/756, 763.1, 764.1, 765.1, 766.1, 164.1; 180/282
See application file for complete search history.

(56) References Cited

U.S. PATENT DOCUMENTS

| | | | |
|---|---|---|---|
| 1,231,531 A | 6/1917 | Shilling | 293/114 |
| 1,932,031 A | 10/1933 | Bellantese | 280/755 |
| 3,397,898 A * | 8/1968 | Denney et al. | 280/755 |
| 5,684,456 A | 11/1997 | Walter | 340/440 |
| 5,744,872 A | 4/1998 | Cario | 307/10.1 |
| 5,931,499 A | 8/1999 | Sutherland | 280/755 |
| 6,202,488 B1 | 3/2001 | Cash | 73/514.26 |
| 6,394,738 B1 * | 5/2002 | Springer | 414/673 |
| 6,588,799 B1 | 7/2003 | Sanchez | 280/755 |
| 7,137,473 B2 * | 11/2006 | Rickers | 180/282 |
| 7,357,416 B2 * | 4/2008 | Wagner | 280/764.1 |
| 2008/0122209 A1 * | 5/2008 | Jayasuriya | 280/755 |

\* cited by examiner

*Primary Examiner*—Faye M. Fleming
(74) *Attorney, Agent, or Firm*—Frederick Owens, Esq.; Miller Law Group, PLLC

(57) ABSTRACT

A deployable running board mounted on an automotive vehicle to be laterally extendable so as to engage the ground during a rollover event to increase the rollover resistance of the vehicle. The running boards are connected to a pair of deployment members spaced longitudinally on the vehicle to provide a rapid extension of the running board. Each deployment member includes a telescopic piston that is slidably mounted within a cylinder and that compresses a spring between the piston and the cylinder. A latching mechanism secures the piston in a retracted stated until a rollover event is detected. Releasing the latching mechanism allows the piston to telescope laterally to move the attached running board outwardly of the vehicle to provide a pivot point that increases the static stability factor of the vehicle. The engagement of the extended running board also provides a resistance to the continued motion of the vehicle.

19 Claims, 10 Drawing Sheets

Fig. 6
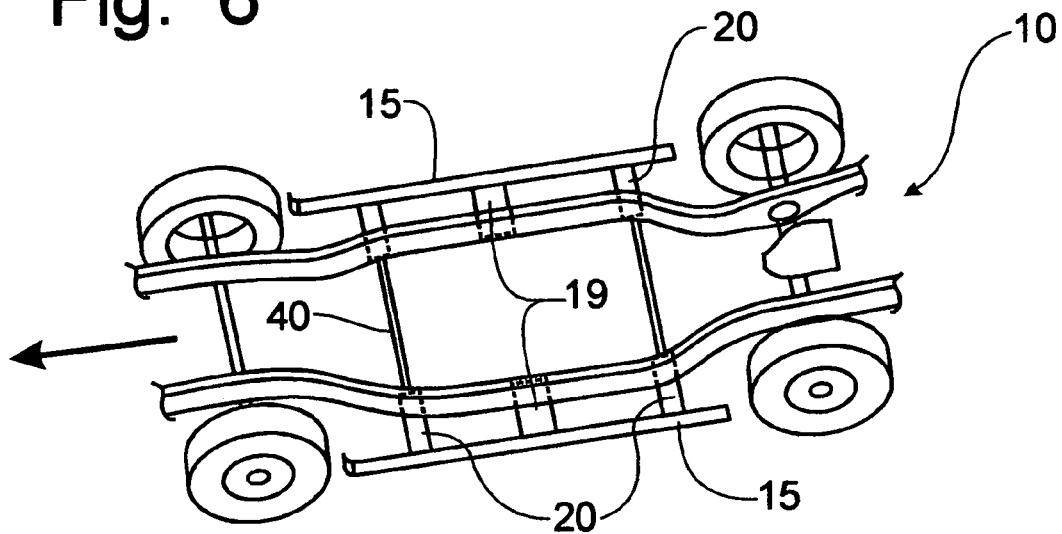
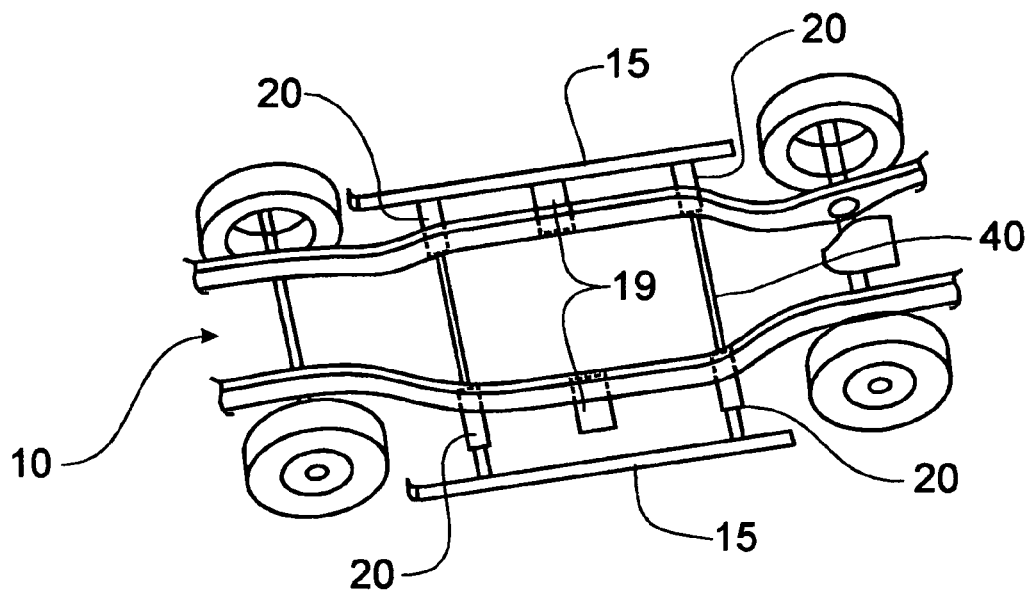
Fig. 7

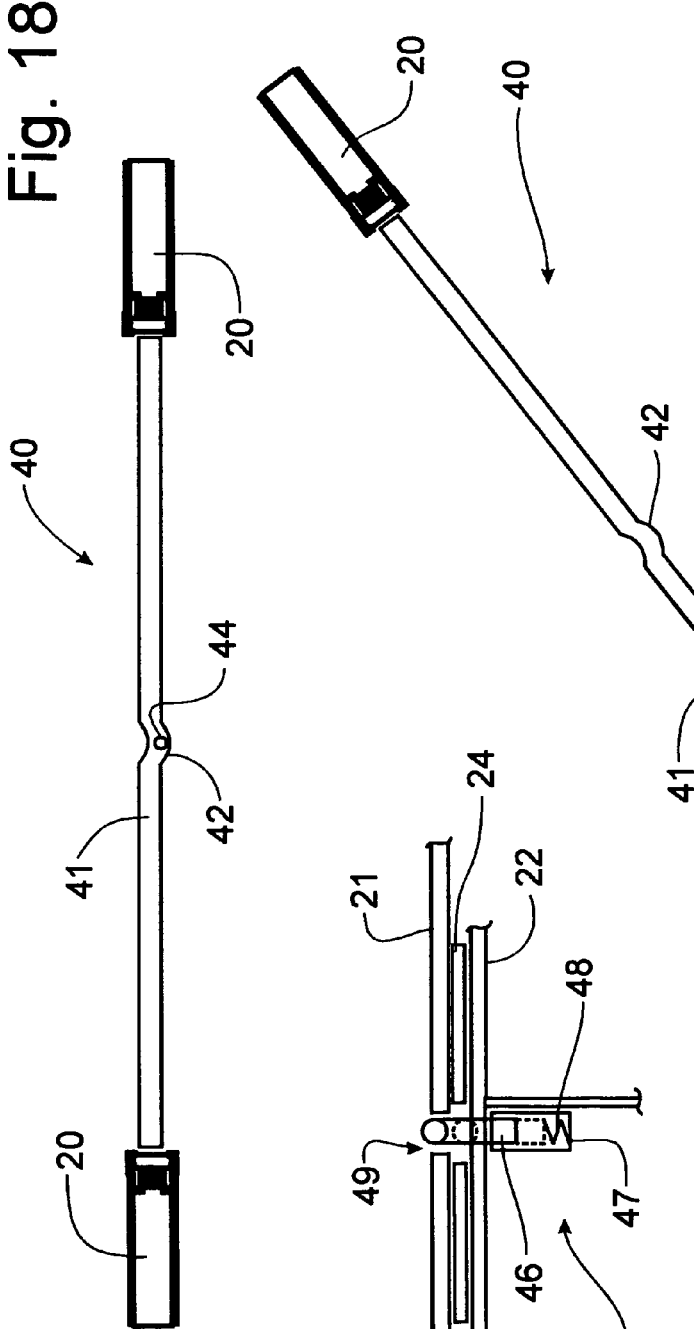
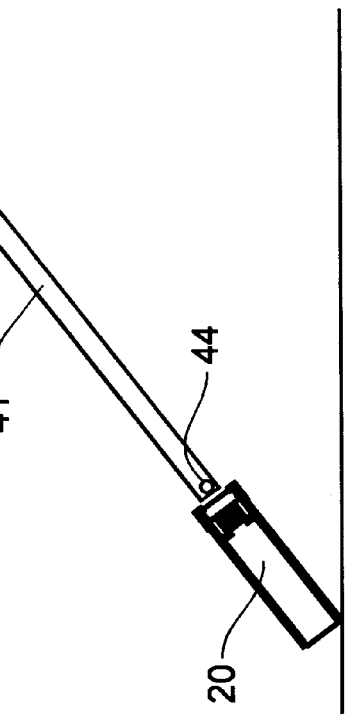

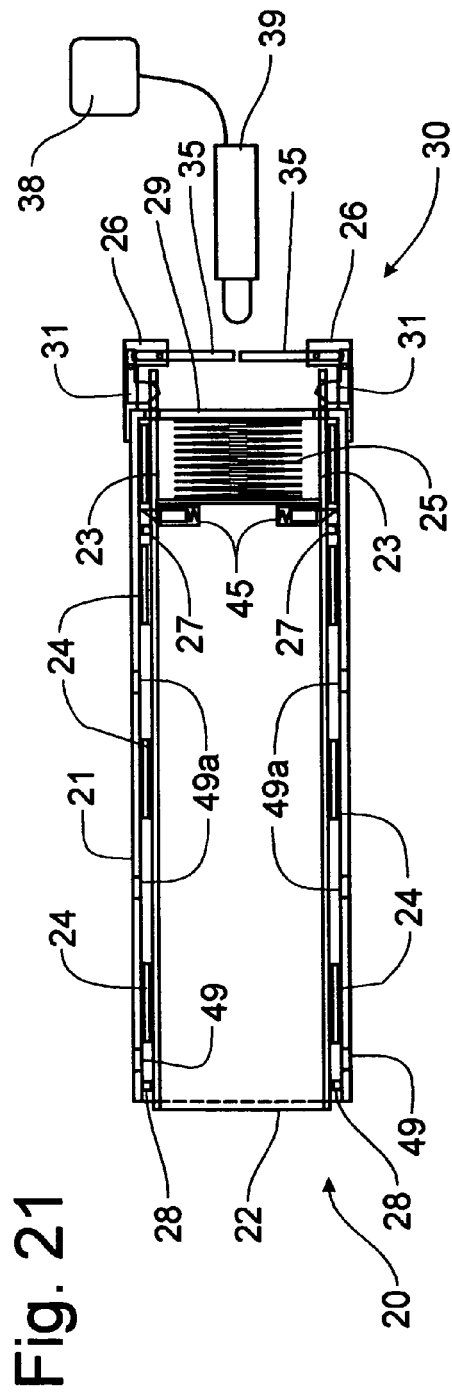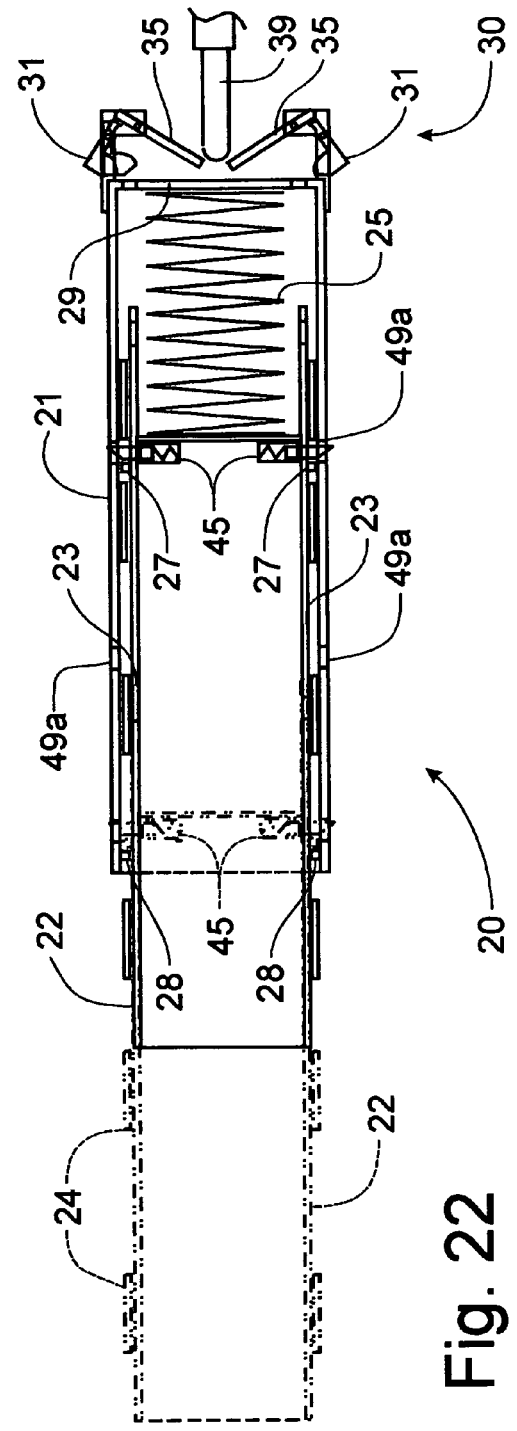

DEPLOYABLE RUNNING BOARD TO PROVIDE ROLLOVER RESISTANCE

FIELD OF THE INVENTION

This invention relates generally to an extendable running board for use on an automotive vehicle and, more particularly, to a running board that is mounted for outward projection in the event of a rollover of the vehicle to increase rollover resistance by increasing the tipped-over angle at the unstable equilibrium.

BACKGROUND OF THE INVENTION

Running boards are available on many automotive vehicles, such as pick-up trucks, and sport utility vehicles, to provide an easy ingress and egress to the vehicles. In some vehicles the running boards are fixed to the frame of the vehicle and are not intended to move in any direction. In other vehicles, the running board is movably mounted for selective positioning for the convenience of the user of the running board. For example a powered movement of the running boards is disclosed in U.S. Pat. No. 6,325,397, issued to David M. Pascoe, et al on Dec. 4, 2001. In this Pascoe patent, the running board is mounted on parallel linkages, which are coupled to an electric motor to effect a powered pivotal movement of the running board between a stored position and a deployed position. Other movable running boards are mechanically moved, such as is disclosed in U.S. Pat. No. 5,697,626, issued to Patrick K. McDonald, et al on Dec. 16, 1997, in which the running board is pivotally supported on the frame of the vehicle and vertically movable by a bell crank that pivotally moves the step portion of the running board. Such movable running boards are utilized solely for the purpose of providing convenient access between the ground and the passenger compartment of the vehicle.

The static stability factor (SSF) of a vehicle is a parameter used by the NHTSA to determine the rollover propensity of an automotive vehicle. A typical passenger car exhibits an SSF in the range of 1.3 to 1.5 while larger vehicles, such as the SUV's may have an SSF value in the range of 1.0 to 1.3, due primarily to the higher location of the center of gravity. The SSF factor is calculated as half the track width divided by the height to the center of gravity of the vehicle. The static stability factor also reflects the tilt table ratio and the centrifugal acceleration per gravity of the vehicle required to pass the point of unstable static equilibrium. Therefore, an increase in the SSF would indicate an increase in the roll angle at which the vehicle would become unstable and roll over to the side of the vehicle. If the effects of the suspension of the vehicle were ignored, passenger cars can be rolled statically to an angle of typically up to 52.4 to 56.3 degrees, or be subject to static lateral accelerations up to 1.3 to 1.5 times the force of gravity before experiencing a rollover event. Pick-up trucks and SUV's have a higher center of gravity resulting in a roll angle of typically about 45 to 52.4 degrees before experiencing a rollover event. When a vehicle is swerved onto gravel or earth during a potential rollover event, an increase in the resistance to the vehicle's speed, roll, yawing and sliding would shorten the time needed to bring the vehicle under control and stability.

In U.S. Pat. No. 1,231,531 granted on Jun. 26, 1917, to E. C. Shilling an automotive vehicle is equipped with a tilt prevention apparatus that is manually operated by pulling a lever to activate the device carried on the front and rear bumpers of the vehicle. The framework slides by gravity to the left or to the right of the vehicle to engage the ground in the event the vehicle goes into a ditch or the like. Similarly, U.S. Pat. No. 1,932,031, issued to S. Bellantese on Oct. 24, 1933, the vehicle carries a laterally shiftable apparatus that is mounted to the frame under the vehicle. The apparatus is activated directly by centrifugal force exerted while driving on a curve which overcomes a set of springs retaining the apparatus in a central position.

In U.S. Pat. No. 5,931,499, granted on Aug. 3, 1999, to D. R. Sutherland, two pyrotechnically activated roll protection devices are disclosed. In one embodiment, laterally extending stabilizer beams are activated by a cylinder/piston with a pyrotechnic charge encased inside the wheel axle shafts. The second embodiment utilizes two pivoted beams attached to the vehicle body frame on each side to rotate about their vertical axes to attain laterally extending positions to prevent roll. Utilizing pyrotechnic charges is a costly design and packaging the cylinder/piston mechanism with squibs would be a significant challenge. Several embodiments of a rollover prevention device for trucks are disclosed in U.S. Pat. No. 6,588,799, granted to A. Sanchez on Jul. 8, 2003. In one embodiment, a laterally extendable arm slides by gravity until the ball on the end of the arm contacts the ground. In another embodiment, a vertically attached gear arm is pivoted at the top to a hollow arm. When the vehicle starts to roll, the hollow arm swings while engaging the gears and gets locked to prevent the vehicle from rolling. In still another embodiment, a sensor activates a vertically mounted piston mechanism that is fixed to the suspension system. The upper and lower pistons are driven by compressed air when roll is sensed to drive the lower piston to engage the ground and the upper piston to push the vehicle body back to a level position.

An inertia-based sensor is disclosed in U.S. Pat. No. 5,684,456, granted to Joachim Walter on Nov. 4, 1997, in which a cube-shaped weight is balanced by flexible arms and two extension measurement elements. The measuring element produces an electrical quantity such as a change in resistance or voltage. An electrical circuit would then be able to detect the roll and activate a remote device to prevent the roll. In U.S. Pat. No. 6,202,488, issued on Mar. 20, 2001, to S. M. Cash, an optical sensor based on inertia is disclosed. Such a sensor could be connected to an electronic control module to activate safety devices such as seatbelts, air bags in the event of a rollover, which is defined as being when the vehicle has rolled more than 75 degrees. Another inertia-based sensor is disclosed in U.S. Pat. No. 5,744,872, granted on Apr. 28, 1998, to Gasper Cairo in which a steel ball is mounted in a cup to generate an electrical signal in conjunction with an opaque projector associated with the movement of the ball.

It would be desirable to provide an apparatus that is operable to increase resistance of an automotive vehicle in conjunction with a deployment of the running boards mounted on the vehicle. It would also be desirable to provide a spring-loaded telescopic mechanism that would be operable to deploy the running boards into a position to increase resistance to rollovers.

SUMMARY OF THE INVENTION

It is an object of this invention to overcome the aforementioned disadvantages of the known prior art by providing a deployable running board that can be positioned to increase the resistance of an automotive vehicle to a rollover.

It is another object of this invention to provide a spring-loaded deployment apparatus for laterally moving a running board mounted on a vehicle into a ground-engaging position to increase the resistance of the vehicle to rollover.

It is still another object of this invention to provide a multifunctional apparatus for an automotive vehicle that can be deployed in a rollover event to increase the resistance of the vehicle to rolling over.

It is a feature of this invention to provide an extendable running board apparatus that can be positioned for engagement with the ground as the vehicle starts to roll over to increase the roll angle at which the vehicle becomes unstable.

It is an advantage of this invention that the extension of the running board laterally from the vehicle provides a pivot point for the vehicle during a rollover event that increases the angle at which the vehicle rolls over.

It is another advantage of this invention that the effective static stability factor of a vehicle in increased by the lateral extension of the running board.

It is another feature of this invention to provide a spring-loaded deployment apparatus that will rapidly extend the position of a vehicle's running board laterally in the event of a rollover event.

It is still another advantage of this invention that the running boards retain their normal position to provide the primary function of assisting access into the passenger compartment of the vehicle, except upon the occurrence of a rollover event.

It is yet another object of this invention to provide a deployable structure that can engage the ground in the early stages of a rollover event to provide resistance to the motion of the vehicle, including forward motion.

It is another feature of this invention that the engagement of a deployment running board with the surface of the ground increases resistance to the velocity of the vehicle, as well as yawing and sliding motions.

It is still another advantage of this invention that the deployment of the running board to engage the surface of the ground will help stabilize the vehicle before becoming unstable during a rollover event.

It is yet another advantage of this invention that the running board deployment apparatus can be re-set to re-position the vehicle running boards to their normal position after being extended laterally to increase rollover resistance for the vehicle, in the case when the rollover was prevented and the parts were not damaged.

It is still another feature of this invention that deployment apparatus can be positioned to extend the running board horizontally or angularly toward the ground.

It is yet another feature of this invention that the deployment apparatus is formed of a telescopic piston mounted in a cylinder to be extendable therefrom by a spring compressed between the piston and the cylinder.

It is a further advantage of this invention that the telescopic piston is latched into a retracted position corresponding to the normal position of the running board which is connected to the telescopic piston.

It is a further feature of this invention that the latching mechanism is associated with an actuation device to trigger the release of the telescopic piston when a rollover event is detected.

It is still a further feature of this invention that the roll angle at which a vehicle becomes unstable can be increased from approximately 50 degrees to greater than 70 degrees.

It is still a further advantage of this invention that the lateral extension of the running board into engagement with the ground provides an additional resistance to motion to reduce speed, yawing and sliding.

It is yet a further feature of this invention that the deployment apparatus can be activated by a mechanical apparatus, as well as an electronic apparatus.

It is another feature of this invention that the latching mechanism includes two pairs of interacting pivoting members to control the release of the telescopic piston from the cylinder in which the telescopic piston is retracted.

It is another advantage of this invention that the first pair of pivoted members is operable to prevent the second pair of pivoted members from moving to affect the release of the telescopic piston.

It is still another feature of this invention that the telescopic piston is formed with latch members that project through openings in the back plate of the cylinder housing the telescopic piston to engage the latching mechanism.

It is a further object of this invention to provide deployable running board that is laterally extendable to increase rollover resistance of a vehicle that is durable in construction, inexpensive of manufacture, carefree of maintenance, facile in assemblage, and simple and effective in use.

These and other objects, features and advantages are accomplished according to the instant invention by providing a deployable running board mounted on an automotive vehicle to be laterally extendable so as to engage the ground during a rollover event to increase the rollover resistance of the vehicle. The running boards are connected to a pair of deployment members spaced longitudinally on the vehicle to provide a rapid extension of the running board. Each deployment member includes a telescopic piston that is slidably mounted within a cylinder and that compresses a spring between the piston and the cylinder. A latching mechanism secures the piston in a retracted stated until a rollover event is detected. Releasing the latching mechanism allows the piston to telescope laterally to move the attached running board outwardly of the vehicle to provide a pivot point that increases the static stability factor of the vehicle. The engagement of the extended running board also provides a resistance to the continued motion of the vehicle.

BRIEF DESCRIPTION OF THE DRAWINGS

The advantages of this invention will become apparent upon consideration of the following detailed disclosure of the invention, especially when taken in conjunction with the accompanying drawings wherein:

FIG. 6 is a schematic perspective view of the vehicle frame similar to that of FIG. 3, but depicted a third running board embodiment;

FIG. 7 is a schematic perspective view of the vehicle frame of FIG. 6 showing the left running board being laterally extended;

FIG. 18 is a cross-sectional view of a mechanical actuation mechanism associated with the deployment apparatus, the actuation mechanism being shown in a neutral position;

FIG. 19 is a cross-sectional view of the actuation mechanism shown in FIG. 16 but tilted into an activating position;

FIG. 20 is an enlarged detail view of a portion of the stop mechanism carried by the activation member to prevent separation of the activation member from the base member;

FIG. 21 is a cross-sectional view similar to that of FIG. 14, but depicting an alternative embodiment of the deployment apparatus, the piston being depicted in the retracted position compressing the spring between the piston and the cylinder slidably housing the piston, the latching mechanism being depicted in the latched position;

FIG. 22 is a cross-sectional view similar to that of FIG. 15, but depicting the deployment apparatus shown in FIG. 21 with the piston partially telescopically extended, the full extension of the piston being shown in phantom;

DETAILED DESCRIPTION OF THE PREFERRED EMBODIMENT

Referring to FIGS. 1-7, an automotive vehicle utilizing a laterally extendable running board apparatus incorporating the principles of the instant invention can best be seen. The vehicle 10 is depicted as a sport utility vehicle; however, one of ordinary skill in the art will readily recognize that any vehicle 10 on which a running board can be mounted can utilize the instant invention, including sport utility vehicles, pick-up trucks, vans, mini-vans, and the like. Any left and right references used within this description are used as a matter of convenience and are determined by standing at the rear of the vehicle and facing the forward direction. The principles of the instant invention are applicable to many different types or configurations of running boards, three of which are depicted in a representative manner in FIGS. 1-7.

Figure 8:
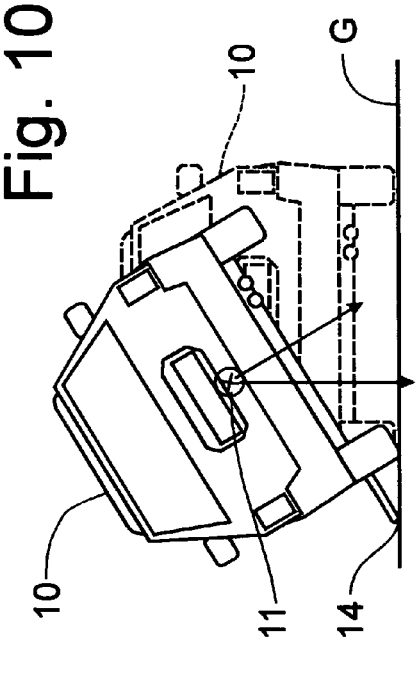
FIG. 8 is a diagrammatic rear elevational view of an automotive vehicle, the center of gravity being depicted by the circled "X"
Figure 9:
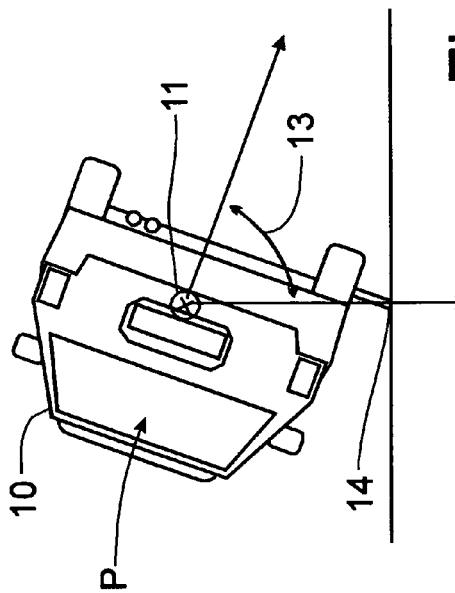
FIG. 9 is a diagrammatic rear elevational view of the prior art vehicle showing the maximum roll angle before the vehicle becomes unstable and rolls over on its side.

The running board 15 is supported from the frame 12 of the vehicle 10 and is typically positioned on both the left and right sides of the vehicle 10 to provide assistance for the ingress and egress of the passenger compartment P of the vehicle 10. The principle of the instant invention is to cause a deployment of the running board 15 laterally outwardly relative to the vehicle 10 to change the pivot point about which the vehicle 10 turns during a rollover event. The principles of the invention are reflected in FIGS. 8-13. In FIGS. 8 and 9, the typical prior art situation is depicted in which the stable vehicle 10 in FIG. 8 is subjected to forces that tip the vehicle 10 about the pivot point 12 defined as the engagement of the outer edge of the tire with the surface of the ground G. When a line passing vertically through the center of gravity 11 is aligned with the pivot point 12, the vehicle 10 becomes unstable and will roll over on its side, as is depicted in FIG. 9. The maximum roll angle 13 is defined as the angle at which the vehicle 10 tilts relative to the normal position shown in FIG. 8. In the typical prior art situation, this maximum roll angle is normally in the range of 45-52 degrees, depending on the height and configuration of the vehicle 10.

Figure 10:
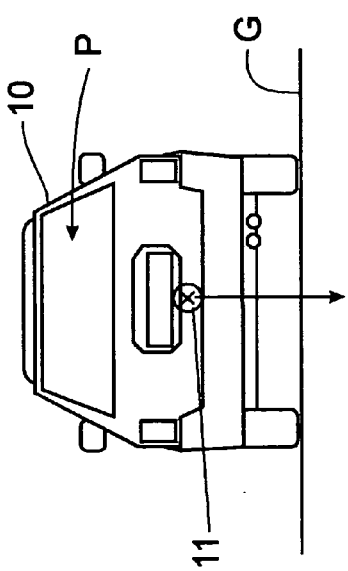
FIG. 10 is a diagrammatic rear elevational view of a vehicle having a deployable running board incorporating the principles of the instant invention, the running board being depicted in a laterally extended position and engaging the surface of the ground.
Figure 11:
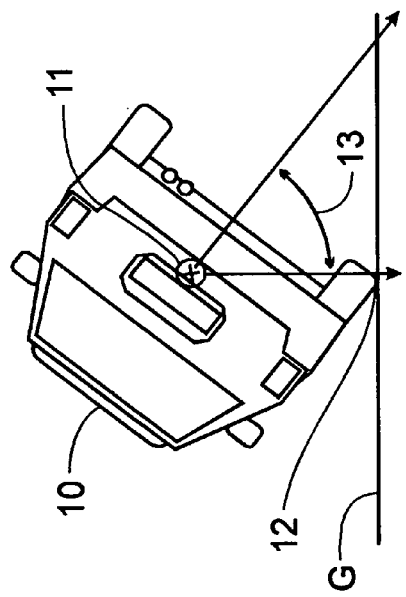
FIG. 11 is a diagrammatic rear elevational view of the vehicle depicted in FIG. 10 showing the maximum roll angle before the vehicle becomes unstable and rolls over.

In FIGS. 10 and 11, the running board 15 is extended laterally to change the position of the pivot point 14 laterally outwardly to be located where the extended running board 15 engages the surface of the ground G. As reflected in FIG. 11, the maximum roll angle 13 increases to approximately 70 degrees. Depending on the size and configuration of the vehicle 10, the running board 15 would engage the surface of the ground G to establish the pivot point 14 when the vehicle 10 tilts to an angle of about 30 degrees. Accordingly, the extended running board 15 increases the resistance of the vehicle 10 to a rollover event by increasing the maximum roll angle 13 at which the vehicle 10 loses stability.

Figure 12:
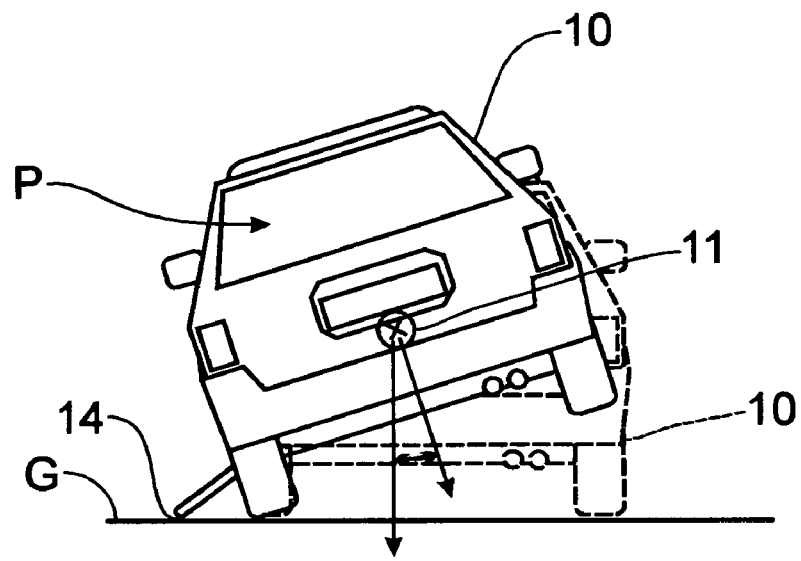
FIG. 12 is a diagrammatic rear elevational view of a vehicle having a second embodiment of the deployable running board depicted in the laterally extended position where the running board engages the ground.
Figure 13:
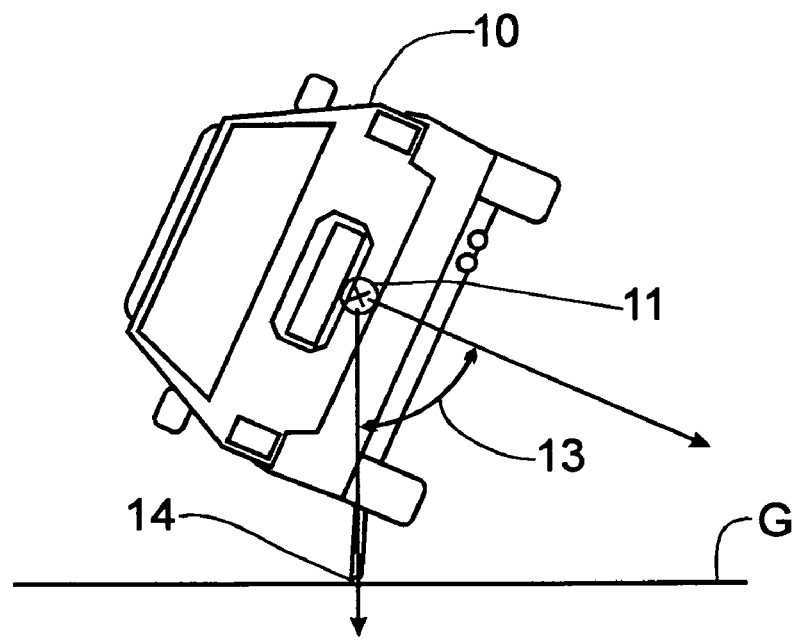
FIG. 13 is a diagrammatic rear elevational view of the vehicle depicted in FIG. 12 but showing the maximum roll angle before the vehicle becomes unstable and rolls over.

A slightly different embodiment of the deployable running board 15 is reflected in FIGS. 12 and 13. In this embodiment, the running board is deployed outwardly and downwardly so that the extended running board 15 engages the ground G sooner than in the embodiment depicted in FIGS. 10 and 11 to establish the pivot point 14. As depicted in FIG. 12, the vehicle 10, depending on size and configuration, would engage the running board 15 into the ground G when the vehicle 10 has tilted approximately 17 degrees, as compared to approximately 30 degrees for the embodiment depicted in FIG. 10. Since the engagement of the running board 15 with the ground G also establishes a resistance to continued motion of the vehicle 10, i.e. the engaged running board 15 would tend to reduce the vehicle's velocity, yawing and sliding movement, the earlier engagement of the downwardly angled, extended running board 15 can help stabilize the vehicle 10 before reaching the maximum roll angle. With the pivot point 14 being slightly closer to the vehicle 10, given the same amount of movement of the running board 15, the maximum roll angle 13 is reduced to approximately 65 degrees; however, this maximum roll angle is still greater than is found in the typical prior art situation depicted in FIGS. 8 and 9.

The static stability factor (SSF) of a vehicle is computed by the dividing half of the vehicle's transverse width by the height of the center of gravity above the surface of the ground. Thus, SSF=T/2H. By extending the position of the pivot point 14 for the vehicle outboard of the tire, the effective transverse width of the vehicle is increased by the distance from the pivot point 12 at the outer edge of the tire to the pivot point 14 at the point of contact of the extended running board 15 with the ground G. Since the value of T is increased in the above formula, the value of the effective SSF is similarly increased.

Referring now to FIGS. 1-7, the deployable running board 15 can best be seen. The running board 15 is supported from the frame of the vehicle 10 in a manner to allow the outward movement thereof The running board 15 can have a fixed base member 16 and a movable member 18 mounted on the fixed base member and its support brackets, but movable relative thereto. The support of the movable member 18 on the fixed base member 16 allows the running board 15 to support a person getting in or out of the passenger compartment of the vehicle 10. The outer beam of the movable member 18 can be comprised of a sled runner type beam or individual pads attached to the outer end, 14 of the telescopic members 20. One skilled in the art will readily recognize that other support configurations for the running board 15 are possible to allow the function of support for ingress and egress for the vehicle, while allowing the running board 15 to be deployed laterally outwardly in the event of a rollover. A deployment apparatus 20 is attached to the movable member 18 of the running board 15 to affect the laterally outward movement thereof when a rollover event is sensed. An actuation mechanism 40 is operatively associated with the deployment apparatus 30 to cause the deployment of the movable member 16.

Figure 3:
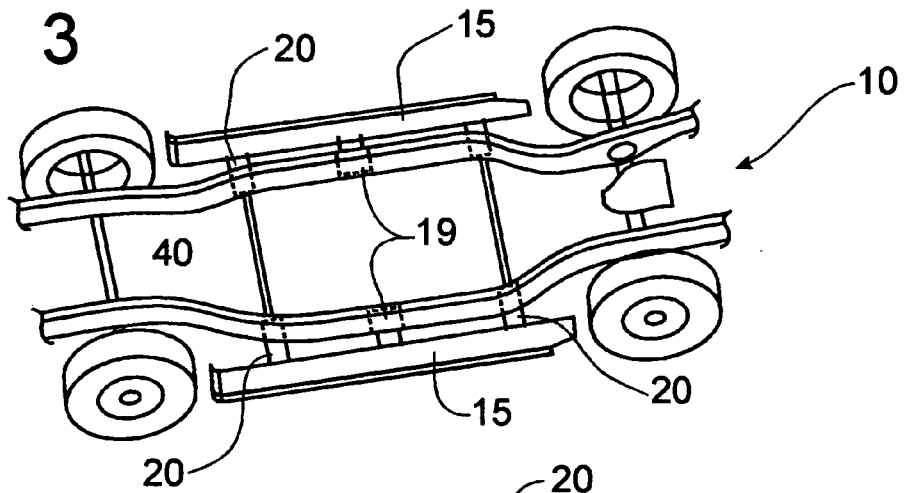
FIG. 3 is a schematic perspective view of the frame of the vehicle having a running board incorporating the principles of the instant invention supported thereon.
Figure 4:
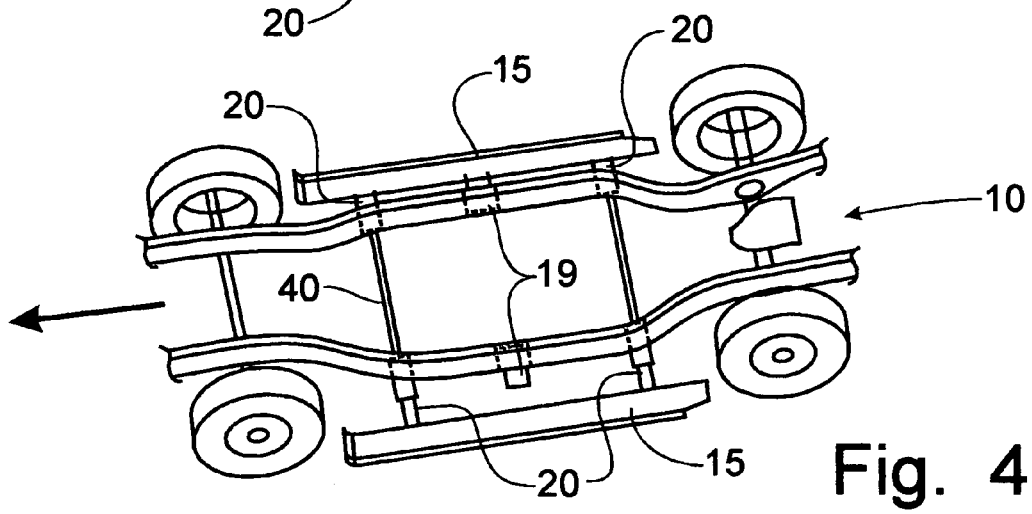
FIG. 4 is a schematic perspective view of the vehicle frame depicted in FIG. 3, but showing the relative extended position of a first embodiment of the laterally extendable running board mounted on the left side of the frame.
Figure 5:
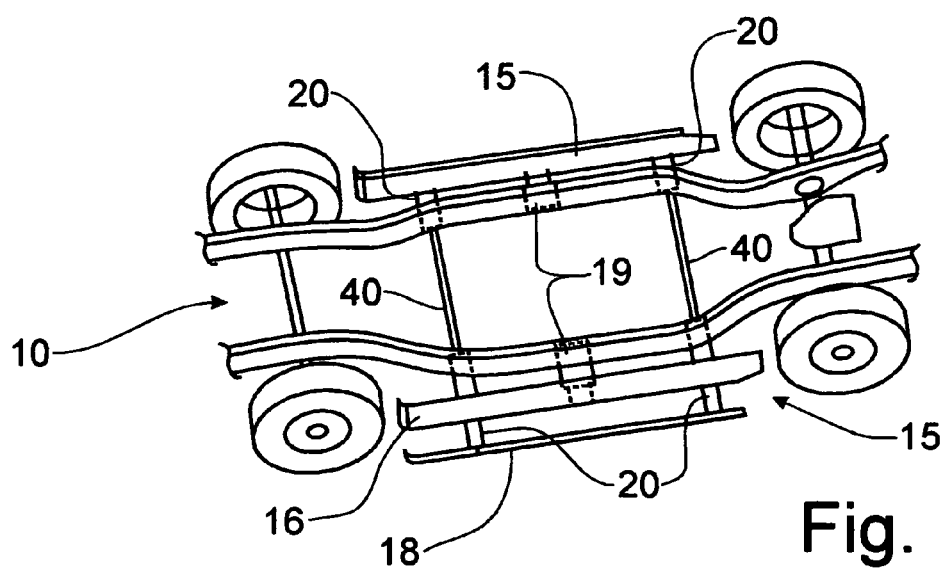
FIG. 5 is a schematic perspective view of the vehicle frame depicted in FIG. 3, but showing a second embodiment of the extendable running board, the left running board being shown in the extended position.

Different representative configurations of the running board 15 are shown in FIGS. 3-7. In FIGS. 3 and 4, a full sled type of running board 15 is shown in which the entire running board 15 is mounted on the deployment apparatus 20 and is extended outwardly thereby. A central support 19 may be required provide additional support for the running board 15. In FIG. 5, only the outer rail portion 18 of the running board 15 is laterally movable with respect to the inboard fixed portion 16. In FIGS. 6 and 7, the running board 15 is a rail-type of running board and is move easily movable in a lateral direction. This rail-type of running board 15 is particularly adaptable for use in the alternative configuration in which the running board 15 is moved outwardly and downwardly, as will be described in greater detail below.

The deployment apparatus 20 is best seen in FIGS. 14-17. Preferably, the deployment apparatus 20 is formed of a telescopic assembly that includes a base member 21 and an extendable activation member 22. Preferably, a spring 25 is compressed between the activation member 22 and the base member 21 to spring-load the activation member 22 for deployment. The shape of the deployment apparatus 20 can be cylindrical, rectangular, or any other shape conducive to telescopic movement. Anti-friction members 24, such as Teflon or polymer spacers, are optionally used between the base member 21 and the activation member 22 to facilitate the rapid telescopic extension of the activation member 22. A latching mechanism 30 is mounted at the end of the base member 21 to cause a release of the activation member 22 when a rollover event is sensed. The running board 15, or the extendable portion 18 thereof, is connected to the activation member 22 so as to be extendable therewith.

The latching mechanism 30 is mounted on the end of the base member 21 by axially extending mounts 26. The activation member 22 includes a pair of axially extending arms 23 that project through openings in the end plate 29 of the base member 21 to extend along the mounts 26 for engagement by the latching mechanism 30 through an opening 23a. The latching mechanism 30 is formed of a latch member 31 pivotally supported in each respective mount 26 and including a keeper member 32 positionable within the opening 23a. The keeper member 32 is formed with a cam surface 33 directed inwardly toward the center of the end plate 29 so that the force exerted by the spring 25 is operable to move the keeper member 32 out of the opening 23a when released. The distal end of the keeper member 32 is formed with a curved pocket 34 to receive the locking end 36 of the trip member 35.

Figure 16:
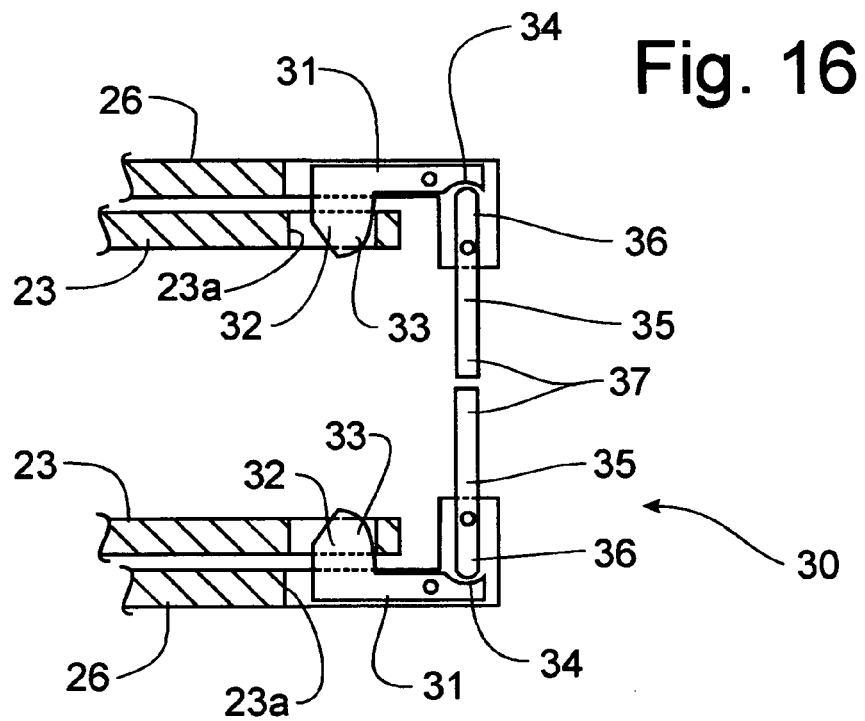
FIG. 16 is a partial cross-sectional view of the deployment apparatus depicting an elevational view of the latching mechanism in the latched position.

A trip member 35 is also pivotally supported in each respective mount 26 and is formed with a locking end 36 and a trip end 37 on opposing sides of the pivotal mount, with the trip end 37 being inboard of the locking end 36. The locking end 36 fits into the pocket 34 of the corresponding latch member 31. Since the spring force exerted on the keeper member 32 urges the latch member 31 outwardly out of the opening 23a in the arm 23, the pocket 34 is urged into engagement with the locking end 36 of the trip member 35 to freeze both the latch member 31 and the trip member 35 into a secured position, as is depicted in FIG. 16, with the trip ends 37 of the respective trip members 35 being oriented in general transverse alignment and in close proximity to one another. The spring force on the latch member 31 fixes the locking end 36 within the pocket 34 which prevents the latch member 31 from moving out of the opening 23a. With the keeper member 32 in interference with the arm 23, the activation member 22 is restrained in the retracted position, as depicted in FIG. 14.

Figure 1:
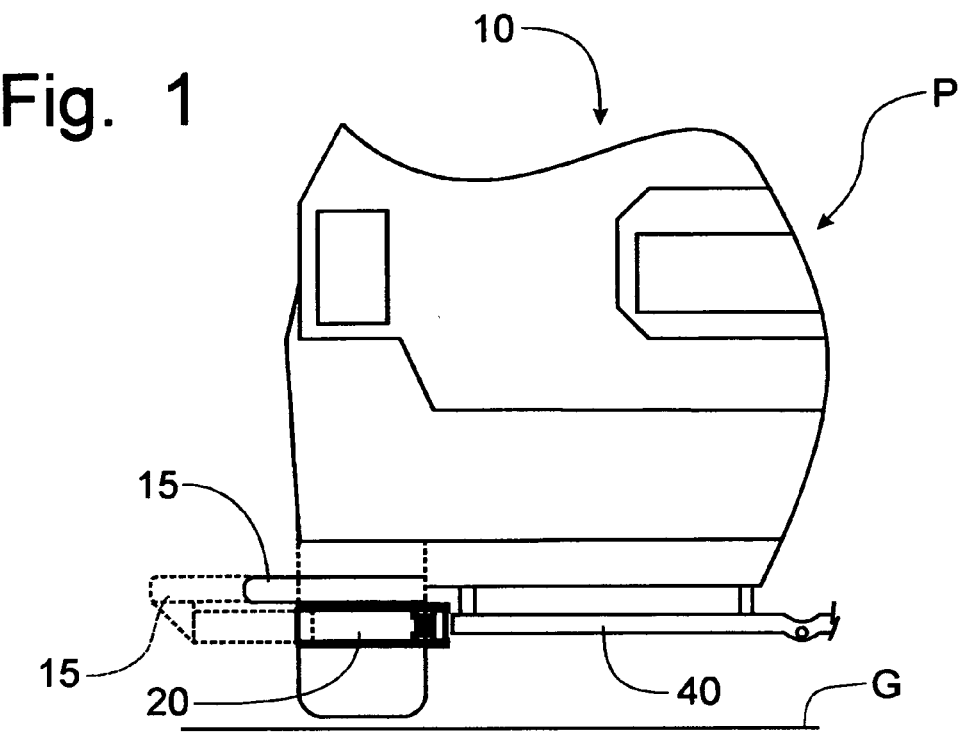
FIG. 1 is a partial rear elevational view of an automotive vehicle having a laterally extendable running board coupled to a deployment apparatus according to the principles of the instant invention, the rear tire being broken away to better view the apparatus located between the front and rear tires, the laterally extended position of the running board being shown in phantom.
Figure 2:
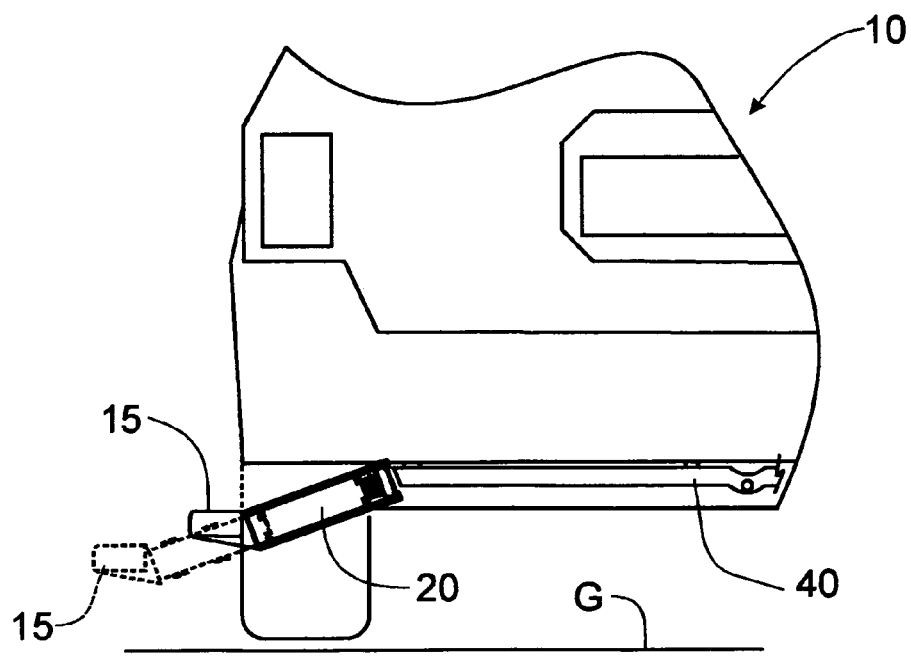
FIG. 2 is a partial rear elevational view of an automotive vehicle having a second embodiment of an extendable running board incorporating the principles of the instant invention, the laterally extended position of the running board being shown in phantom.
Figure 15:
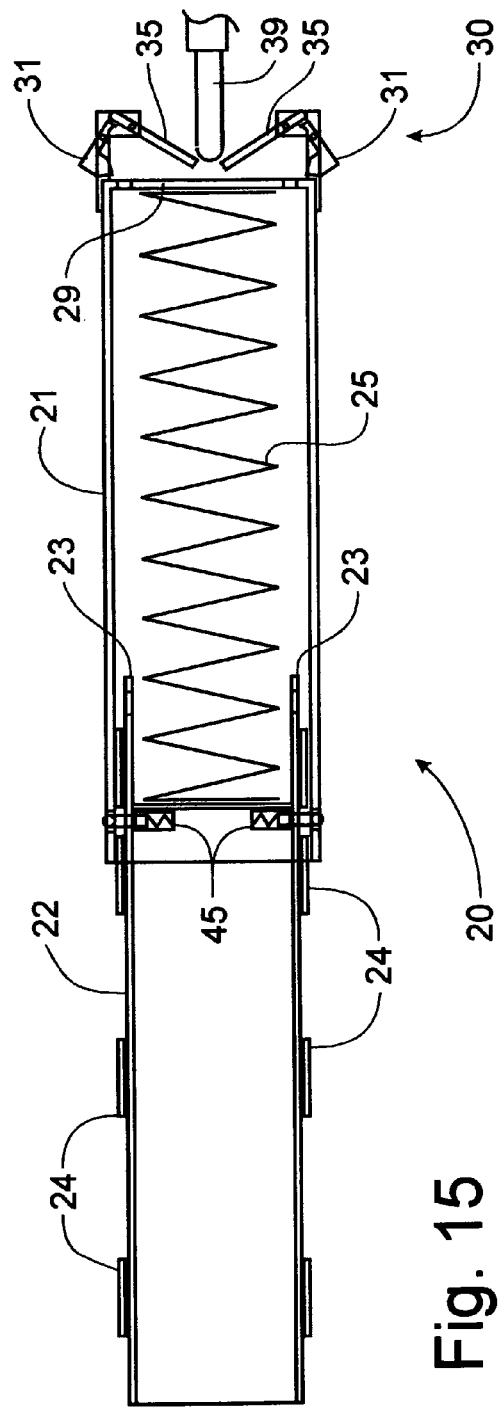
FIG. 15 is a cross-sectional view of the deployment apparatus similar to that of FIG. 14 but showing the piston telescopically extended to affect a lateral movement of the attached running board, the latching mechanism being depicted in the release position.
Figure 17:
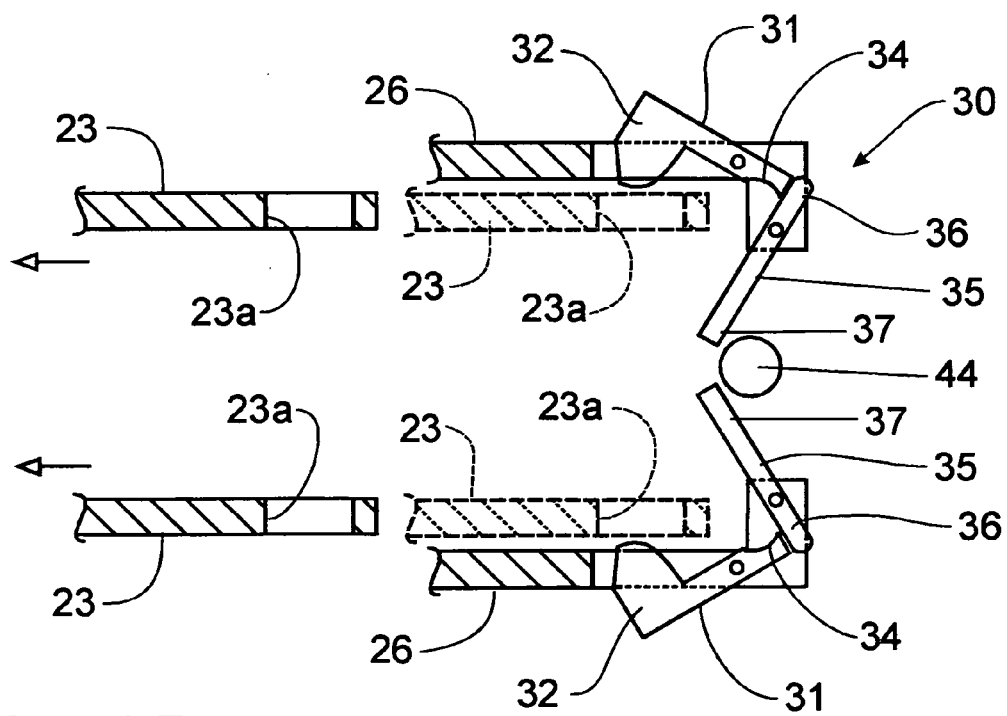
FIG. 17 is a partial cross-sectional view of the deployment apparatus depicting an elevational view of the latching mechanism in the release position, the latch members of the telescopic piston being shown as moving toward the extended position.
Figure 23:
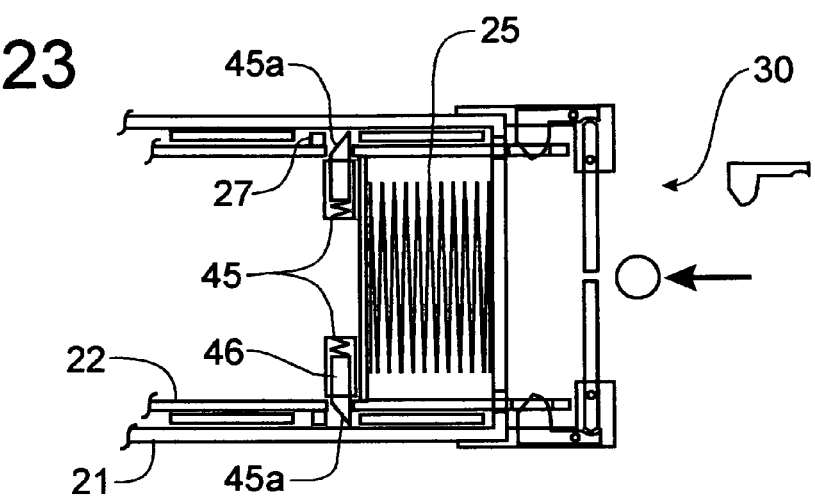
FIG. 23 is a partial cross-sectional view of the deployment apparatus depicting an elevational view of the stop mechanism as oriented when the piston is in the retracted position.
Figure 24:
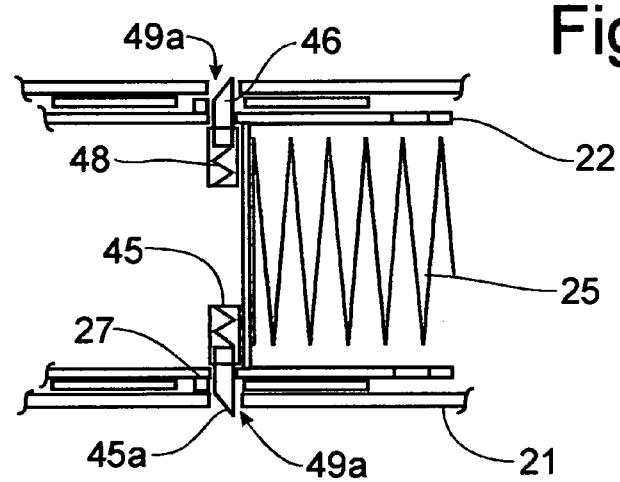
FIG. 24 is a partial cross-sectional view of the deployment apparatus depicting an elevational view of the stop members when the piston has been halted at an intermediate position.
Figure 25:
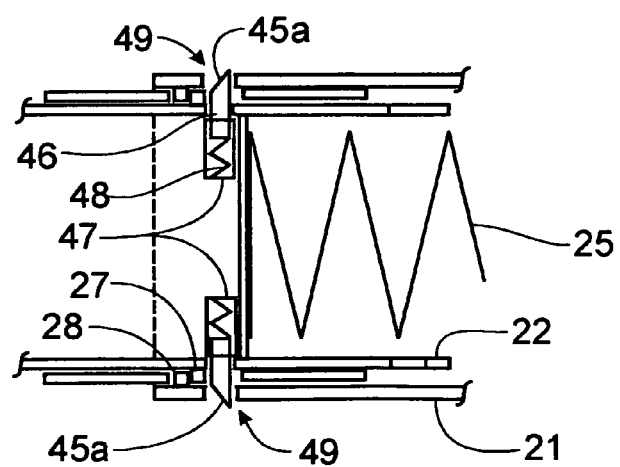
FIG. 25 is a partial cross-sectional view of the deployment apparatus depicting an elevational view of the stop members when the piston is fully extended.

The latching mechanism 30 is actuated by an apparatus, such as a solenoid 39 connected to an electronic roll sensor 38, or other mechanical device 40, which will be described in greater detail below, to force a movement of the trip ends 37 of the trip members 35, as is depicted in FIGS. 15 and 17. The forced movement of the trip ends 37 results in a pivotal movement of the trip members 35 to move the locking ends 36 out of engagement with the corresponding pockets 34. Without the trip members 35 preventing the latch members 31 from pivotally moving, the force exerted on the keeper members 32 by the spring 25 on the cam surfaces 33 pops the keeper members 32 out of the openings 23a and frees the activation member 22 to extend outwardly from the base member 21. Because of the strength of the spring 25, the telescopic projection of the activation member 22 is fairly rapid. With the running board 15 connected to the activation members 22, the extension of the activation members 22 results in a lateral movement of the running board 15 connected thereto, as is depicted in FIGS. 1 and 2 in phantom.

One skilled in the art will recognize that the latching mechanism 30 can also be formed with a single latch member (not shown) on each respective mount 26 without a separate trip arm. In such a configuration, the latch members could be restrained in the locking position by a solenoid, or other device that can be energized by a sensor to cause the latch members (not shown) to pivot outwardly to affect release of the activation member 22.

Figure 14:
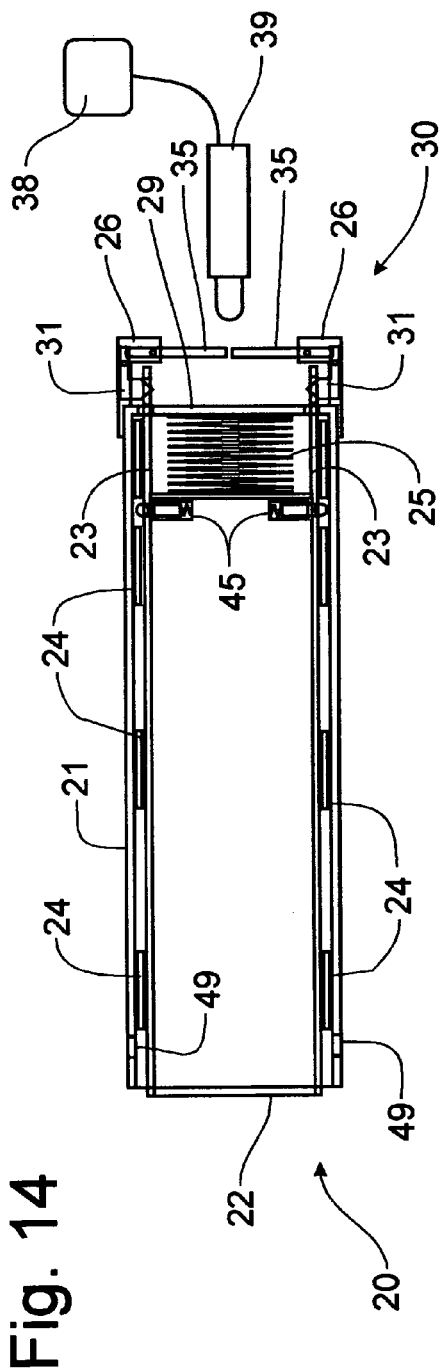
FIG. 14 is a cross-sectional view through the deployment apparatus attached to the extendable running board, the piston being depicted in the retracted position compressing the spring between the piston and the cylinder slidably housing the piston, the latching mechanism being depicted in the latched position.

To prevent the activation member 22 from completely separating from the base member 21, the deployment apparatus 20 also incorporates a stop mechanism 45, best seen in FIGS. 14, 15 and 20, that prevents the separation of the activation member 22. Preferably, the stop member 45 is a spring-loaded pin 46 retained within a housing 47 capturing a spring 48 to extend the pin 46 through a hole 49 in the base member 21 when the pin 46 becomes aligned therewith upon extension of the activation member 22 from the base member 21. The housing 47 could be carried by the base member 21 on the outside surface thereof so that the spring-loaded pin 46 extends through an opening (not shown) formed in the activation member 22. However, because of the desire to provide a deployment apparatus 20 that can be reset, as is described in greater detail below, the housing is better positioned internally of the activation member 22.

An alternative embodiment of the stop mechanism 45 is shown in FIGS. 21-25. Instead of the spring-loaded pin 46 having a detent ball that projects through holes 49 in the base member 21, the pin 46 is formed with a cam surface 45a that causes the pin 46 to retract into the activation member 22 when the activation member 22 is moving outwardly. The base member 21 is formed with at least one pair of intermediate openings 49a between the respective ends of the base member 21, and preferably two pairs of intermediate openings 49a. If the spring-loaded pins 46 pop into the intermediate opening 49a while the activation member 22 is being deployed outwardly from the base member 21, the engagement between the cam surface 45a and the perimeter of the intermediate opening 49a causes the pin 46 to retract into the base member 21 so as to not be restrictive to the deployment of the activation member 22. At the end of the base member 21, a stop block 28 is attached to the interior of the base member 21 to be engagable with a corresponding retainer block 27 affixed to the exterior side of the activation member 22 and positioned to interfere with the stop block 28. Thus, when the activation member 22 is fully deployed, the interference between the retainer member 27 and the stop block 28 prevents the activation member 22 from becoming disengaged from the base member 21.

The pins 46, however, are operable to prevent the activation member 22 from being retracted back into the base member 21. Since the cam surface 45a is only located on one side of the pin 46, the exertion of a force on the activation member 22 to urge the activation member 22 back into the base member 21 is countered by the extension of the pin 46 into the hole 49, 49a with which the pin 46 is engaged. Thus, if the running board 15 encounters an object, such as a curb, that prevents the full deployment of the attached activation member 22 from the base member 21, the pins 46 will not have reached the end openings 49 to lock the activation member 22 in place on the base member 21. Accordingly, the activation member 22 can slide inwardly relative to the base member 21 until the pins 46 align with an intermediate opening 49a, at which time the pins 46 will extend through the intermediate opening 49a and prevent any further retraction of the activation member 22 into the base member 21. Then, if the obstacle becomes non-interfering, the activation member 22 is free to fully extend to the end of the base member 21 where the pins 46 will extend through the openings 49 and lock the activation member into place. Retraction of the pins 46 would be accomplished substantially the same as is described above with the first embodiment described above.

An alternative orientation of the deployment apparatus 20 is depicted best in FIG. 2 and represented in FIGS. 12 and 13. Instead of mounting the deployment apparatus 20 in a horizontal orientation, as is depicted in FIG. 1, for example, the deployment apparatus 20 is positioned at an angle to horizontal so that the extension of the activation member 22 will be outwardly and downwardly toward the ground. As is noted above with respect to FIGS. 12 and 13, this angular orientation of the deployment apparatus 20 places the pivot point 14 a little closer to the vehicle 10 than the horizontal orientation would create, but still increases the effective transverse width of the vehicle 10 and the corresponding SSF value. The benefit of the angular acceleration is that the tipping points 14 will touch the ground earlier than a horizontally placed equal length deployment apparatus. This will result in acting an early counter balancing force to prevent complete rollover. One skilled in the art will recognize that the sloped or angular orientation of the deployment apparatus 20 can reduce the length of the deployment apparatus 20 as the amount of movement toward the ground G would preferably be less than needed for a horizontal extension of the running board 15.

Preferably, each running board 15 would be attached to a pair of deployment apparatus 20 spaced fore-and-aft on the running board 15. Extension of the running board 15 would require activation of both deployment apparatuses 20. The running board 15 on both sides of the vehicle 10 would be similarly equipped. While the sensor 38 can be operable to activate only the running board on the low side of the vehicle, sometimes the vehicle will bounce back to roll over the other side, which could happen during certain maneuvers, whereupon the sensor 38 will then activate the deployment apparatus 20 on the opposite side of the vehicle 10 to extend that running board 15 as well.

Once activated, the mechanically operable deployment apparatus 20 can be reset, provided that the components thereof have not been damaged in a manner that would prevent the resetting and subsequent operation of the deployment apparatus 20 in a proper manner. To reset the deployment apparatus, the pin 46 is pushed back into the housing 47 while the activation member 22 is slightly retracted into the base member 21 against the spring 25 so that the spring-loaded pin 46, which preferably is provided with a ball at the tip thereof to facilitate movement thereof along the base member 21, will ride on the interior surface of the base member 21 until becoming aligned with the opening 49. The activation member 22 is then pushed completely back into the base member 21 until the arms 23 extend through the openings in the end plate 29 of the base member 21 such that the keeper members 32 are aligned with the openings 23a. While restraining the activation member 22 against the spring 25, the latching mechanism 30 is reset by pushing the keeper member 32 into the opening 23a and the trip members are re-aligned so that the locking ends 46 are positioned in the pockets 34 of the latch members 31. The deployment apparatus is then reset for subsequent deployment as described above.

Referring now to FIGS. 1, 2, 18 and 19, an actuation mechanism 40 is shown to provide a simple mechanical sensing and actuation operation based on inertia for use with the deployment apparatus 20. The actuation mechanism includes a transversely extending tube 41 that extends from a contiguous location at one deployment apparatus 20 on one side of the vehicle 10 to the deployment apparatus 20 on the opposing side of the vehicle 10. Midway between the two opposing deployment apparatuses 20, the tube 41 is formed with a cup 42 that houses a ball 44. The cup 42 is shaped to retain the ball 44 unless the vehicle 10 tilts to a pre-selected roll angle, as represented in FIG. 19, whereupon the ball is released from the cup 42 and rolls by gravity down the inclined tube 42 until the ball 44 strikes the trip ends 37 of the trip members 35 causing the trip members 35 to pivot and release the latch members 31. The ball 44 has been found to be of sufficient size and weight to affect a pivoting of the trip members 35 when the ball is formed of steel and has a diameter of one-half inch. Accordingly, the tube 41 and the cup 42 would require a configuration to match the size and shape of the ball 44 to permit a free movement thereof.

In operation, the vehicle 10 begins to incur a roll over event, tipping to one side as is represented in FIG. 10. Once the vehicle 10 has reached a roll angle sufficient to dislodge the ball 44 from the cup 42, the ball 44 rolls at the speed induced by gravity to the deployment apparatus 20 on the lower side of the vehicle 10 until impacting the trip members 35. The pivotal movement of the trip members 35 releases the latch members 31 allowing the activation member 22 to extend telescopically from the base member 21 until stopped by the spring-loaded stop members 45 interengaging the activation and base members 22, 21. Once the activation members 22 are extended, the running board 15 is moved laterally outwardly by virtue of the connection thereof with the outboard ends of the activation members 22.

Once extended and engaged with the surface of the ground G, the running boards 15 serve to retard the forward velocity of the vehicle 10 and restrict any yawing and sliding movement of the vehicle 10. Depending on the severity of the forces associated with the rollover event being incurred, the engagement of the extended running board 15 with the ground might be satisfactory to halt some rollover motion of the vehicle 10. In the event the vehicle 10 continues to roll over, the point of engagement of the running board 15 with the ground G creates a pivot point 14 that is outboard of the tires and, thus, enables the vehicle 10 to continue through a roll angle that is greater than the maximum roll angle associated with a pivot point at the tire, before becoming unstable and rolling onto the side of the vehicle 10.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. An automotive vehicle, comprising:
   a frame supported over the surface of the ground by wheels;
   a passenger compartment supported on the frame;
   a running board supported from the frame to assist with ingress and egress of the passenger compartment; and
   a deployment apparatus mounted on the frame and connected to the running board to extend the running board outwardly from the frame upon sensing a rollover event, the deployment apparatus including:
      a base member mounted to the frame;
      an activation member telescopically received within the base member for linear movement relative thereto, the activation member being movable between a retracted position and an extended position, the activation member being connected to the running board; and
      a spring interposed between the activation member and the base member to bias the activation member toward the extended position.

2. The automotive vehicle of claim 1 wherein the running board is operable to contact the surface of the ground and establish a pivot point for the automotive vehicle outboard of the wheels to increase resistance of the vehicle to rolling over such that the frame is not supported on the ground by the wheels.

3. The automotive vehicle of claim 2 wherein the deployment apparatus is in operative communication with an actuation mechanism that senses the rollover event and actuates the deployment apparatus.

4. The automotive vehicle of claim 3 wherein the deployment apparatus further comprises:
   a latching mechanism operable to restrain the activation member in the retracted position until actuated by the actuation mechanism.

5. The automotive vehicle of claim 4 wherein the latching mechanism comprises a latch member pivotally mounted on the base member and being engagable with an arm affixed to the activation member, the latch member being operable to disengage the arm when pivotally moved in conjunction with actuation by the actuation mechanism.

6. The automotive vehicle of claim 4 wherein the latching mechanism comprises:
   a latch member pivotally mounted on the base member and being engagable with an arm affixed to the activation member; and
   a trip member pivotally mounted on the base member and having a locking end engagable with the latch member and a trip end, the engagement between the locking end and the latch member preventing the latch member from pivoting until the trip end is moved by the actuation mechanism to affect disengagement between the locking end and the latch member.

7. The automotive vehicle of claim 6 wherein the latch member includes a keeper member having a cam surface thereon engaged through an opening in the arm, the biasing force exerted on the activation member by the spring urging the keeper member out of engagement with the arm, the latch member being unable to pivot out of engagement with the arm until the trip member is moved out of engagement with the latch member by the actuation mechanism.

8. The automotive vehicle of claim 7 wherein the actuation mechanism is a solenoid operably coupled to a rollover sensor, the solenoid being operable to cause movement of the trip end when receiving a signal from the rollover sensor of the existence of the rollover event.

9. The automotive vehicle of claim 3 wherein the base member is mounted in a generally horizontal orientation to extend the running board laterally outwardly in a generally horizontal direction.

10. The automotive vehicle of claim 4 wherein the base member is mounted at an acute angle to horizontal to extend the running board from a retracted position to an extended position that is laterally outwardly and downwardly from the retracted position.

11. A deployment apparatus connected to a running board on an automotive vehicle to move the running board from a normal position, in which the running board performs a function of assisting with ingress to and egress from the vehicle, and an anti-rollover position in which the running board is engagable with the ground during a rollover event to establish a pivot point, for the vehicle during the rollover event while the automotive vehicle remains in a stable condition, that is outboard of an adjacent tire of the vehicle, comprising:
   a base member mounted to the vehicle;
   an activation member telescopically received within the base member for linear movement relative thereto, the activation member being movable between a retracted position and an extended position, the activation member being connected to the running board;

a spring interposed between the activation member and the base member to bias the activation member toward the extended position;

a latching mechanism operable to restrain the activation member in the retracted position until actuated; and an actuation mechanism operable to sense the existence of the rollover event and actuate the latching mechanism to release the activation member for movement to the extended position.

12. The automotive vehicle of claim 11 wherein the latching mechanism comprises a latch member pivotally mounted on the base member and being engagable with an arm affixed to the activation member, the latch member being operable to disengage the arm when pivotally moved in conjunction with actuation by the actuation mechanism.

13. The automotive vehicle of claim 11 wherein the latching mechanism comprises:

a latch member pivotally mounted on the base member and being engagable with an arm affixed to the activation member; and a trip member pivotally mounted on the base member and having a locking end engagable with the latch member and a trip end, the engagement between the locking end and the latch member preventing the latch member from pivoting until the trip end is moved by the actuation mechanism to affect disengagement between the locking end and the latch member.

14. The automotive vehicle of claim 13 wherein the latch member includes a keeper member having a cam surface thereon engaged through an opening in the arm, the biasing force exerted on the activation member by the spring urging the keeper member out of engagement with the arm, the latch member being unable to pivot out of engagement with the arm until the trip member is moved out of engagement with the latch member by the actuation mechanism.

15. The automotive vehicle of claim 13 wherein the base member is mounted in a generally horizontal orientation to extend the running board laterally outwardly in a generally horizontal direction.

16. The automotive vehicle of claim 13 wherein the base member is mounted at an acute angle to horizontal to extend the running board from a retracted position to an extended position that is laterally outwardly and downwardly from the retracted position.

17. A method of increasing resistance in an automotive vehicle to rolling over, the automotive vehicle including a frame supporting a running board operable to assist ingress to and egress from the vehicle, comprising the steps of:

mounting the running board to a deployment apparatus for moving the running board from a normal position to an anti-rollover position that is located laterally outwardly of the normal position;

detecting existence of a rollover event;

unlatching the activation member connected to the running board in a retracted position within a base member supported on the vehicle after the detecting step;

extending the activation member by a spring compressed between the activation member and the base member, when the activation member is in the retracted position, to drive the activation member telescopically from the base member; and stopping the activation member in an extended position corresponding to the running board being in the anti-rollover position.

18. The method of claim 17 wherein detecting step includes an actuation step that affects the unlatching step, the actuation step being operable to trip a latching mechanism mounted on the base member and restraining the activation member in the retracted position.

19. The method of claim 18 wherein the mounting step orients the base member at an acute angle to a horizontal orientation so that the extending step moves the running board to the anti-rollover position that is laterally outboard and downward from the normal position.

* * * * *